(12) United States Patent
Pruett

(10) Patent No.: US 6,639,365 B2
(45) Date of Patent: Oct. 28, 2003

(54) ULTRA-COMPACT ARC DISCHARGE LAMP SYSTEM WITH AN ADDITIONAL ELECTRODE

(75) Inventor: Henry Frazier Pruett, Sandy, OR (US)

(73) Assignee: InFocus Corporation, Wilsonville, OR (US)

( * ) Notice: Subject to any disclaimer, the term of this patent is extended or adjusted under 35 U.S.C. 154(b) by 0 days.

(21) Appl. No.: 09/961,635

(22) Filed: Sep. 21, 2001

(65) Prior Publication Data

US 2003/0057867 A1 Mar. 27, 2003

(51) Int. Cl.[7] .................................................. H01J 7/44
(52) U.S. Cl. ........................... 315/60; 315/57; 315/291; 315/289; 313/594; 313/601
(58) Field of Search ................................ 315/289, 291, 315/209 R, 276, 57, 60; 313/594, 591, 595, 234, 601, 602

(56) References Cited

U.S. PATENT DOCUMENTS

| | | | |
|---|---|---|---|
| 4,350,930 A | * 9/1982 | Peil et al. | .................... 315/178 |
| 4,539,513 A | * 9/1985 | Ganser et al. | ............... 315/173 |
| 4,888,528 A | * 12/1989 | Byszewski et al. | ......... 313/594 |
| 4,952,848 A | * 8/1990 | Erhardt | ........................ 315/244 |
| 6,380,679 B1 | * 4/2002 | Leers et al. | .................. 313/594 |

FOREIGN PATENT DOCUMENTS

| WO | WO99/48133 | | 9/1999 |
|---|---|---|---|
| WO | WO00/77826 | A1 | 12/2000 |

* cited by examiner

Primary Examiner—Haissa Philogene
(74) Attorney, Agent, or Firm—Schwabe, Williamson & Wyatt, PC

(57) ABSTRACT

An arc discharge lamp system comprises a third electrode for igniting the arc discharge lamp in addition to first and second electrodes which provide a main discharge current path for sustaining arc discharge after the lamp has been ignited by a high-voltage, high-frequency signal applied to the third electrode. In an embodiment, an igniter circuit is connected to provide the high-voltage, high-frequency signal to the third electrode of the lamp by using a low-voltage DC power supply.

19 Claims, 2 Drawing Sheets

ULTRA-COMPACT ARC DISCHARGE LAMP SYSTEM WITH AN ADDITIONAL ELECTRODE

BACKGROUND OF THE INVENTION

1. Field of the Invention

The present invention relates to arc discharge lamps, and more particularly, to ultra-compact arc discharge lamps for portable applications.

2. Background Art

Arc discharge lamps have been widely used in fixed and portable projectors because of the ability of arc discharge lamps to produce high intensity light. In a conventional arc discharge lamp, high intensity light is produced by arc discharge in an ionized gas. Conventional arc discharge lamps typically require a high initial starting voltage which ionizes or breaks down the gas inside a hermetically sealed lamp envelope.

A conventional arc discharge lamp typically has two conducting electrodes which are positioned close to each other inside the lamp envelope. The gas inside the lamp envelope is initially ionized by applying a high voltage on one or both of the electrodes. In a typical igniter circuit for a conventional two-electrode arc discharge lamp, a large and heavy igniter transformer is usually required to provide a high voltage for ionizing the gas inside the lamp envelope and to support a large current through the two electrodes in the arc discharge lamp to sustain illumination once the arc discharge begins.

In a conventional two-electrode arc discharge lamp system, an igniter transformer is required not only to produce a high voltage for igniting the arc discharge lamp by ionizing the gas inside the lamp envelope, but also to pass a large current through the two electrodes to maintain arc discharge after the gas inside the lamp envelope is ionized. The igniter transformer is typically a large and heavy magnetic component in a conventional two-electrode arc discharge lamp system. An increase in the power of the arc discharge lamp usually necessitates an increase in the size and weight of the igniter transformer. The size and weight of the igniter transformer in a conventional two-electrode arc discharge lamp system makes it unattractive for use in lightweight portable projectors that produce high-intensity illumination.

Therefore, there is a need for a compact and lightweight arc discharge lamp system that is suitable for use in a lightweight high-power portable projector. Furthermore, there is a need for an arc discharge lamp system for a lightweight portable projector that uses a low-voltage DC power source.

BRIEF DESCRIPTION OF THE DRAWINGS

The present invention will be described with respect to particular embodiments thereof, and references will be made to the drawings in which.

DETAILED DESCRIPTION

Figure 1:
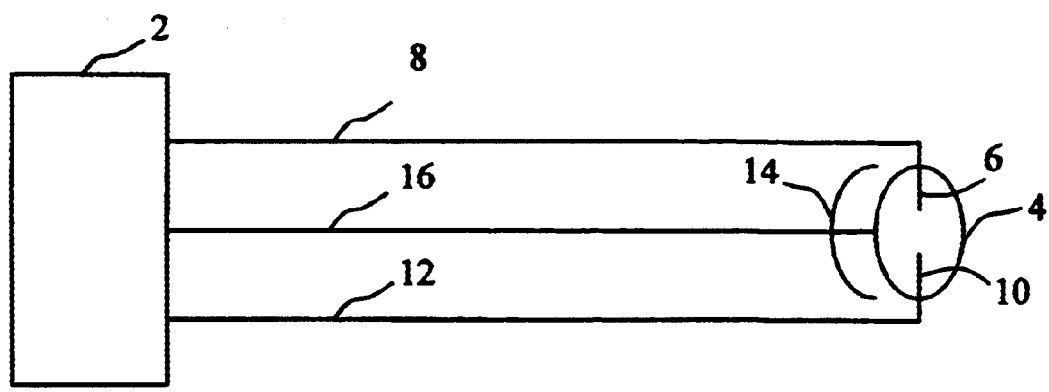
FIG. 1 shows a block diagram of an arc discharge lamp system with three electrodes according to an embodiment of the present invention.

FIG. 1 shows a block diagram of a three-electrode arc discharge lamp system, comprising circuitry 2, also called "ballast", for generating electrical energy for initiating and sustaining arc discharge in an arc discharge lamp 4. The arc discharge lamp 4 has a first electrode 6 connected to a positive output voltage line 8 of the ballast 2, a second electrode 10 connected to a negative output voltage line 12 of the ballast 2, and a third electrode 14 connected to an igniter output line 16 of the ballast 2. In an embodiment, the ballast 2 comprises a conventional circuit for generating sustained arc discharge through the first and second electrodes 6 and 10 for the arc discharge lamp 4 to produce continued illumination, and a separate circuit for igniting the arc discharge lamp by initially ionizing the gas inside the lamp. An embodiment of the igniter circuit 4 for initially ionizing the gas in the three-electrode arc discharge lamp will be described in further detail below with reference to FIG. 3.

Figure 2:
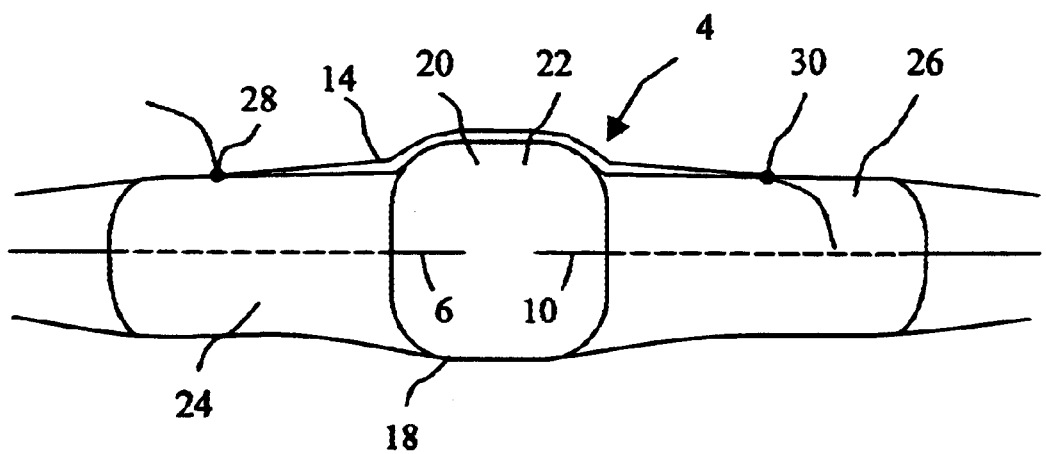
FIG. 2 shows a simplified side view of a three-electrode arc discharge lamp according to an embodiment of the present invention, with first and second electrodes inside a lamp envelope and a third electrode outside the lamp envelope.

FIG. 2 shows a simplified side view of an arc discharge lamp having three conducting electrodes according to an embodiment of the present invention. The arc discharge lamp 4 has a hermetically sealed lamp envelope 18 defining a closed interior space 20, which is filled with at least one gas that can be ionized to produce light when arc discharge occurs in the interior space 20 of the lamp envelope 18. In an embodiment, the interior space 20 of the hermetically sealed lamp envelope 18 may be filled with an inert gas, such as argon. A small amount of halogens may also be mixed with argon to fill the interior space of the lamp envelope. In an embodiment, the hermetically sealed lamp envelope 18 comprises a transparent portion 22 made of glass, for example, and opaque portions 24 and 26 made of a ceramic material, for example.

As shown in FIG. 2, the first and second electrodes 6 and 10 protrude into the interior space 20 of the hermetically sealed envelope 18 to generate arc discharge for producing continuous illumination after the gas inside the lamp envelope is ionized by the third electrode 14. In an embodiment, the third electrode 14 is positioned outside the lamp envelope 18 close to the outer surfaces of the lamp envelope. In the embodiment shown in FIG. 2, the third electrode 14 is attached to the lamp envelope 18 at attachment points 28 and 30.

In an embodiment, the third electrode 14 is placed closely to the outside surfaces of the lamp envelope 18 so that it is physically as close as possible to the first and second electrodes 6 and 10, which are the two main conducting electrodes for producing arc discharge. In an embodiment, a high-voltage, high-frequency signal is supplied to the third electrode 14 to initiate ionization of the gas inside the interior space 20 of the lamp envelope 18, thereby obviating the need for the first and second electrodes 6 and 10 to pass a high operating current after the gas in the interior space 20 of the lamp envelope 18 has been ionized.

In an embodiment, an igniter circuit is connected to the third electrode 14 to provide the high-voltage, high-frequency signal to ignite the arc discharge lamp 4, by initially ionizing the gas inside the interior space 20 of the hermetically sealed lamp envelope 18. When an arc discharge lamp with three conducting electrodes is used in a lightweight portable projector, it may be desirable that the arc discharge lamp system be able to utilize a low-voltage direct current (DC) power source to generate the high-voltage, high-frequency signal required for igniting the arc discharge lamp by the third electrode.

Figure 3:
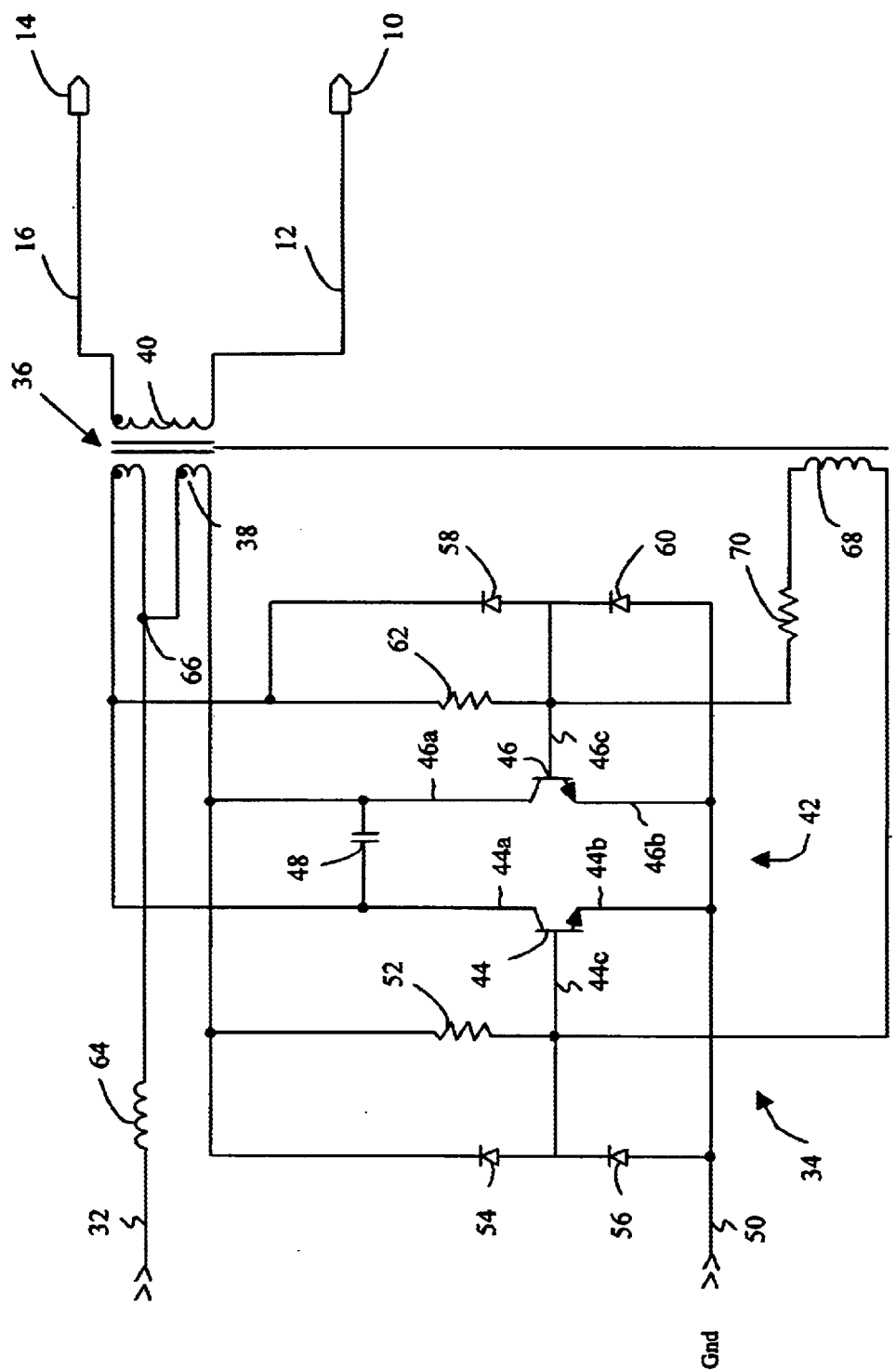
FIG. 3 shows a diagram of an igniter circuit for the three-electrode arc discharge lamp according to an embodiment of the present invention.

FIG. 3 shows a diagram of an embodiment of an igniter circuit for performing the function of initiating ionization of the gas inside the interior space of the lamp envelope with a low input DC voltage according to an embodiment of the present invention. In this embodiment, a DC input line 32 carries a relatively low input DC voltage, for example, a DC voltage from a twelve-volt battery, to a DC to AC converter 34 which is capable of converting the low input DC voltage to a low AC voltage.

The DC to AC converter 34 is connected to a transformer 36, which steps up the low AC voltage to produce the high-voltage, high-frequency AC signal, which is transmitted to the third electrode 14 to ignite the arc discharge lamp, that is, to initiate ionization of the gas inside the lamp envelope of the arc discharge lamp. As shown in FIG. 3, the transformer 36 comprises a primary winding 38 connected to the DC to AC converter 34 and a secondary winding connected to output lines 12 and 16. The igniter output line 16 is connected to the third electrode 14 of the arc discharge lamp, while the negative output voltage line 12 is connected to the second electrode 10 of the arc discharge lamp.

In an embodiment, the DC to AC converter 34 comprises a self-oscillating current-fed push-pull circuit 42 for generating oscillations to form a high-frequency, high-voltage AC signal. In the embodiment shown in FIG. 3, the self-oscillating current-fed push-pull circuit 42 comprises a pair of npn bipolar transistors 44 and 46 and a resonant capacitor 48, which determines the resonant frequency of oscillation generated by the push-pull circuit 42. In FIG. 3, the resonant capacitor 48 is connected between the collectors 44a and 46a of the first and second transistors 44 and 46, respectively. The emitters 44b and 46b of the first and second transistors 44 and 46 are connected together to ground 50.

The base 44c of the first transistor 44 is connected to a resistor 52 and two diodes 54 and 56. The anode of the diode 56 is connected to ground 50, while the cathode of the diode 56 is connected to the anode of the diode 54. The cathode of the diode 54 and the resister 52 as well as the collector 46a of the second transistor 46 are connected to one end of the primary winding 38 of the AC transformer 36. In a similar manner, two diodes 58 and 60 and a resister 62 are connected to the base 46c of the second transistor 46. The anode of the diode 60 is connected to ground 50, while the cathode of the diode 60 is connected to the anode of the diode 58. The cathode of the diode 58 and the resistor 62 as well as the collector 44a of the first transistor 44 are connected to another end of the primary winding 38 of the AC transformer 36.

The input DC voltage line 32 is connected through an inductor 64 to an intermediary point 66 of the primary winding 38 of the AC transformer 36. In addition, the AC transformer 36 further comprises a feedback winding 68 which is connected to the self-oscillating current-fed push-pull circuit 42 to provide a feedback to the first and second transistors 44 and 46 to sustain the oscillation produced by the push-pull circuit. In an embodiment, a resistor 70 is connected between a terminal of the feedback winding 68 and the base 46c of the second transistor 46, while another terminal of the feedback winding 68 is directly connected to the base 44c of the first transistor 44.

In an example in which the input line 32 of the igniter circuit is connected to a twelve-volt DC power supply, the inductance of the inductor 64 may be on the order of about 100 $\mu$H, while the inductance of the feedback winding 68 may be on the order of about 10 $\mu$H. The resistors 52 and 62 may each have a resistance value on the order of about 33 k$\Omega$, while the resistor 70 may have a resistance value on the order of about 1 k$\Omega$. The resonant capacitor 48 may have a capacitance value on the order of about 33 nF.

The push-pull circuit 42 produces oscillations with a resonant frequency determined by the inductance of the transformer primary and the combined capacitance of the resonant capacitor 48 and parasitic capacitance, if any, within the transformer 36. In an example in which the third electrode 14 is implemented to ignite a 120–270 W arc discharge lamp, the high-voltage, high-frequency signal generated by the secondary winding 40 of the AC transformer 36 may have a voltage of about 1500 volts and a frequency of about 100 kHz.

The capacitance and inductance values of respective elements in the DC to AC converter of the igniter circuit as shown in FIG. 3 may be selected to produce a high oscillation frequency, for example, on the order of about 100 kHz, although the oscillation frequency is usually not critical. The AC transformer 36 has a winding ratio designed to produce a sufficiently high voltage for transmission to the third electrode 14 to ignite the arc discharge lamp. The parameters of respective elements in the circuit as shown in FIG. 3 may be selected in a manner apparent to a person skilled in the art to produce desired voltage and frequency for the ignition of the arc discharge lamp.

The high starting voltage which is applied to the third electrode 14 initially ionizes and breaks down the gases inside the lamp envelope of the arc discharge lamp. Once the ionization has occurred, the operating voltage across the first and second electrodes 6 and 10 as shown in FIGS. 1 and 2 can be much lower than the high starting voltage applied to the third electrode 14. Because the high voltage required for initially ionizing the gases inside the lamp envelope is not in the main discharge current path between the first and second electrodes, the operating current may be as low as 1–5 mA in a three-electrode arc discharge lamp with a power range of 120–270 W, rather than an operating current of approximately 1–9 A typically required in a conventional 120–270 W arc discharge lamp with only two electrodes.

The provision of a third electrode according to embodiments of the present invention obviates the need for the first and second electrodes to initially ignite the arc discharge lamp. The main discharge current path between the first and second electrodes 6 and 10 is thus not required to support a large current once the gases inside the lamp envelope are ionized by the high-voltage, high-frequency signal applied to the third electrode 14. Furthermore, the size of the igniter circuit in an embodiment such as the one shown in FIG. 3 and described above may be independent of the power of the lamp because the igniter circuit is used only for ignition but not for sustaining arc discharge in the main discharge current path.

The present invention has been described with respect to particular embodiments thereof, and numerous modifications can be made which are within the scope of the invention as set forth in the claims.

What is claimed is:

1. An arc discharge lamp system, comprising:
   an elongated lamp envelope defining a closed interior space; at least one gas in the interior space of the lamp envelope;
   first and second spaced apart electrodes extending generally in axial alignment in the interior space of the lamp envelope, the first and second electrodes capable of generating an arc discharge; and
   a third electrode positioned outside and connected directly to the lamp envelope adjacent to and opposite both the first and second electrodes, said third electrode extending between a pair of spaced apart points of attachments to the lamp envelope, one point being adjacent to the first electrode and the other point being adjacent to the second electrode, the third electrode for receiving a high-voltage high-frequency signal to initiate ionization of said at least one gas.

2. The system of claim 1, further comprising an igniter circuit connected to provide the high-voltage high-frequency signal to the third electrode.

3. The system of claim 2, wherein the igniter circuit comprises:
   a direct current (DC) to alternating current (AC) converter capable of converting a low input DC voltage to a low AC voltage; and
   a transformer comprising a primary winding and a secondary winding, the primary winding connected to the DC to AC converter, the secondary winding connected to transmit the high-voltage high-frequency signal to the third electrode.

4. The system of claim 3, wherein the DC to AC converter comprises a self-oscillating current-fed push-pull circuit.

5. The system of claim 4, wherein the push-pull circuit comprises:
   first and second transistors each having a base, a collector and an emitter, the emitters of the first and second transistors connected to each other; and
   a resonant capacitor connected between the collectors of the first and second transistors.

6. The system of claim 1, further comprising an igniter circuit connected to provide the high-voltage high-frequency signal to the third electrode.

7. The system of claim 6, wherein the igniter circuit comprises:
   a direct current (DC) to alternating current (AC) converter capable of converting the low input DC voltage to a low AC voltage; and
   a transformer comprising a primary winding and a secondary winding, the primary winding connected to the DC to AC converter, the secondary winding connected to transmit the high-voltage high-frequency signal to the third electrode.

8. The system of claim 7, wherein the DC to AC converter comprises a self-oscillating current-fed push-pull circuit.

9. The system of claim 8, wherein the push-pull circuit comprises:
   first and second transistors each having a base, a collector and an emitter, the emitters of the first and second transistors connected to each other; and
   a resonant capacitor connected between the collectors of the first and second transistors.

10. An arc discharge lamp system, comprising:
    an elongated lamp envelope defining a closed interior space; at least one gas in the interior space of the lamp envelope;
    first and second spaced apart electrodes extending generally in axial alignment in the interior space of the lamp envelope, the first and second electrodes capable of generating an arc discharge;
    a third electrode positioned outside and connected directly to the lamp envelope adjacent to and opposite both the first and second electrodes, said third electrode extending between a pair of spaced apart points of attachments to the lamp envelope, one point being adjacent to the first electrode and the other point being adjacent to the second electrode, the third electrode for receiving a high-voltage high-frequency signal to initiate ionization of said at least one gas;
    further comprising an igniter circuit connected to provide the high-voltage high-frequency signal to the third electrode;
    a direct current (DC) to alternating current (AC) converter capable of converting a low input DC voltage to a low AC voltage;
    a transformer comprising a primary winding and a secondary winding, the primary winding connected to the DC to AC converter, the secondary winding connected to transmit the high-voltage high-frequency signal to the third electrode;
    wherein the DC to AC converter comprises a self-oscillating current-fed push-pull circuit;
    wherein the push-pull circuit comprises: first and second transistors each having a base, a collector and an emitter, the emitters of the first and second transistors connected to each other; and a resonant capacitor connected between the collectors of the first and second transistors; and
    wherein the push-pull circuit further comprises a plurality of diodes connected to the bases of the first and second transistors.

11. An arc discharge lamp system, comprising:
    an elongated lamp envelope defining a closed interior space; at least one gas in the interior space of the lamp envelope;
    first and second spaced apart electrodes extending generally in axial alignment in the interior space of the lamp envelope, the first and second electrodes capable of generating an arc discharge;
    a third electrode positioned outside and connected directly to the lamp envelope adjacent to and opposite both the first and second electrodes, said third electrode extending between a pair of spaced apart points of attachments to the lamp envelope, one point being adjacent to the first electrode and the other point being adjacent to the second electrode, the third electrode for receiving a high-voltage high-frequency signal to initiate ionization of said at least one gas;

further comprising an igniter circuit connected to provide the high-voltage high-frequency signal to the third electrode;

a direct current (DC) to alternating current (AC) converter capable of converting a low input DC voltage to a low AC voltage;

a transformer comprising a primary winding and a secondary winding, the primary winding connected to the DC to AC converter, the secondary winding connected to transmit the high-voltage high-frequency signal to the third electrode;

wherein the DC to AC converter comprises a self-oscillating current-fed push-pull circuit;

wherein the push-pull circuit comprises: first and second transistors each having a base, a collector and an emitter, the emitters of the first and second transistors connected to each other; and a resonant capacitor connected between the collectors of the first and second transistors; and wherein the transformer further comprises a feedback winding connected to the push-pull circuit to provide a feedback to the first and second transistors to sustain oscillation.

12. An arc discharge lamp system, comprising:

an elongated lamp envelope defining a closed interior space; at least one gas in the interior space of the lamp envelope;

first and second spaced apart electrodes extending generally in axial alignment in the interior space of the lamp envelope, the first and second electrodes capable of generating an arc discharge;

a third electrode positioned outside and connected directly to the lamp envelope adjacent to and opposite both the first and second electrodes, said third electrode extending between a pair of spaced apart points of attachments to the lamp envelope, one point being adjacent to the first electrode and the other point being adjacent to the second electrode, the third electrode for receiving a high-voltage high-frequency signal to initiate ionization of said at least one gas; and wherein the high-voltage high-frequency signal has a voltage of about 1500 V and a frequency of about 100 kHz.

13. An arc discharge lamp system, comprising:

an elongated lamp envelope defining a closed interior space; at least one gas in the interior space of the lamp envelope;

first and second spaced apart electrodes extending generally in axial alignment in the interior space of the lamp envelope, the first and second electrodes capable of generating an arc discharge;

a third electrode positioned outside and connected directly to the lamp envelope adjacent to and opposite both the first and second electrodes, said third electrode extending between a pair of spaced apart points of attachments to the lamp envelope, one point being adjacent to the first electrode and the other point being adjacent to the second electrode, the third electrode for receiving a high-voltage high-frequency signal to initiate ionization of said at least one gas;

wherein the means for initiating ionization of said at least one gas further comprising an igniter circuit connected to provide the high-voltage high-frequency signal to the third electrode;

wherein the igniter circuit comprises: a direct current (DC) to alternating current (AC) converter capable of converting the low input DC voltage to a low AC voltage; and a transformer comprising a primary winding and a secondary winding, the primary winding connected to the DC to AC converter, the secondary winding connected to transmit the high-voltage high-frequency signal to the third electrode; wherein the DC to AC converter comprises a self-oscillating current-fed push-pull circuit;

wherein the push-pull circuit comprises: first and second transistors each having a base, a collector and an emitter, the emitters of the first and second transistors connected to each other; and a resonant capacitor connected between the collectors of the first and second transistors; and wherein the push-pull circuit further comprises a plurality of diodes connected to the bases of the first and second transistors.

14. An arc discharge lamp system, comprising:

an elongated lamp envelope defining a closed interior space; at least one gas in the interior space of the lamp envelope;

first and second spaced apart electrodes extending generally in axial alignment in the interior space of the lamp envelope, the first and second electrodes capable of generating an arc discharge;

a third electrode positioned outside and connected directly to the lamp envelope adjacent to and opposite both the first and second electrodes, said third electrode extending between a pair of spaced apart points of attachments to the lamp envelope, one point being adjacent to the first electrode and the other point being adjacent to the second electrode, the third electrode for receiving a high-voltage high-frequency signal to initiate ionization of said at least one gas;

wherein the means for initiating ionization of said at least one gas further comprising an igniter circuit connected to provide the high-voltage high-frequency signal to the third electrode;

wherein the igniter circuit comprises: a direct current (DC) to alternating current (AC) converter capable of converting the low input DC voltage to a low AC voltage; and a transformer comprising a primary winding and a secondary winding, the primary winding connected to the DC to AC converter, the secondary winding connected to transmit the high-voltage high-frequency signal to the third electrode;

wherein the DC to AC converter comprises a self-oscillating current-fed push-pull circuit;

wherein the push-pull circuit comprises: first and second transistors each having a base, a collector and an emitter, the emitters of the first and second transistors connected to each other; and a resonant capacitor connected between the collectors of the first and second transistors; and wherein the transformer further comprises a feedback winding connected to the push-pull circuit to provide a feedback to the first and second transistors to sustain oscillation.

15. An arc discharge lamp system, comprising:

an arc discharge lamp, comprising:
- a lamp envelope defining a closed interior space;
- at least one gas in the interior space of the lamp envelope;
- first and second electrodes in the interior space of the lamp envelope, the first and second electrodes capable of generating an arc discharge;
- means for initiating ionization of said at least one gas with a low input direct current (DC) voltage;
- wherein the means for initiating ionization of said at least one gas comprises a third electrode positioned outside the lamp envelope adjacent the first and second electrodes, the third electrode capable of receiving a high-voltage high-frequency signal to initiate ionization of said at least one gas; and
- wherein the high-voltage high-frequency signal has a voltage of about 1500 V and a frequency of about 100 kHz.

16. A method of energizing an arc discharge lamp having a lamp envelope enclosing at least one gas, a first electrode, a second electrode and a third electrode, the method comprising the steps of:

- converting a low input direct current (DC) voltage to a low alternating current (AC) voltage;
- transforming the low AC voltage to a high-voltage high-frequency signal;
- applying the high-voltage high-frequency signal to the third electrode to initiate ionization of said at least one gas; and
- wherein the high-voltage high-frequency signal has a voltage of about 1500 V and a frequency of about 100 kHz.

17. The method of claim 16, further comprising the step of generating an arc discharge by the first and second electrodes.

18. The method of claim 16, wherein the step of converting the low input DC voltage to the low AC voltage is performed by a self-oscillating current-fed push-pull circuit.

19. The method of claim 16, wherein the step of transforming the low AC voltage to the high-voltage high-frequency signal is performed by an AC transformer.

* * * * *

UNITED STATES PATENT AND TRADEMARK OFFICE
CERTIFICATE OF CORRECTION

| | | |
|---|---|---|
| PATENT NO. | : 6,639,365 B2 | Page 1 of 1 |
| APPLICATION NO. | : 09/961635 | |
| DATED | : October 28, 2003 | |
| INVENTOR(S) | : Henry Frazier Pruett | |

It is certified that error appears in the above-identified patent and that said Letters Patent is hereby corrected as shown below:

In the Claims:

Col. 8, line 10 "...electrode; wherein"..." should read --...electrode: [New ¶] wherein...--.

Signed and Sealed this

Twenty-first Day of August, 2007

JON W. DUDAS
*Director of the United States Patent and Trademark Office*